No. 624,757. Patented May 9, 1899.
J. H. CRUMB.
DEVICE FOR GATHERING FRUIT.
(Application filed Aug. 20, 1895. Renewed Oct. 28, 1898.)
(No Model.) 2 Sheets—Sheet 1.

WITNESSES:
Paul Jahst
Fred Acker

INVENTOR
J. H. Crumb
BY
Munn & Co
ATTORNEYS.

No. 624,757. Patented May 9, 1899.
J. H. CRUMB.
DEVICE FOR GATHERING FRUIT.
(Application filed Aug. 20, 1895. Renewed Oct. 28, 1898.)
(No Model.) 2 Sheets—Sheet 2.
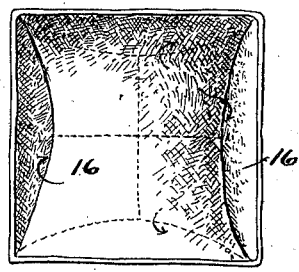
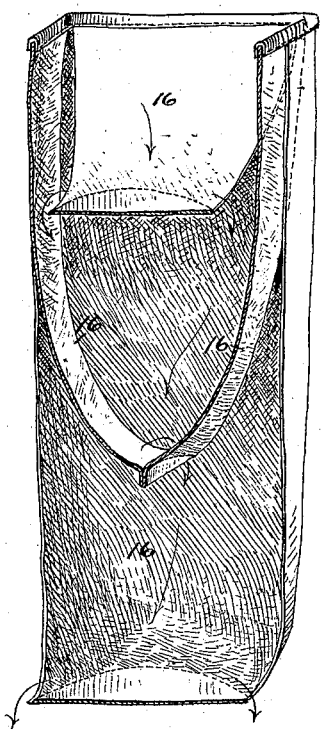
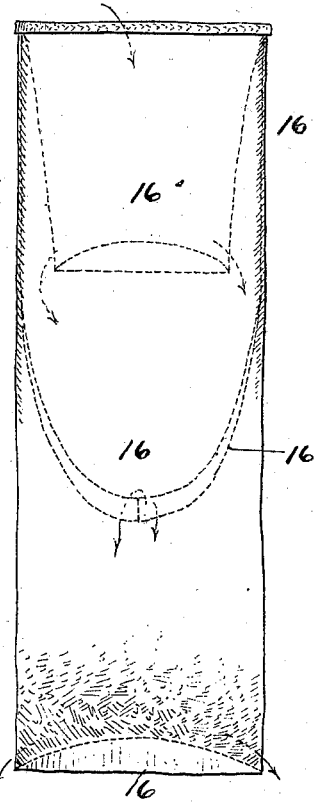
WITNESSES:
INVENTOR
J. H. Crumb.
BY
ATTORNEYS.
THE NORRIS PETERS CO., PHOTO-LITHO., WASHINGTON, D. C.

UNITED STATES PATENT OFFICE.

JOHN H. CRUMB, OF OSAGE CITY, KANSAS.

DEVICE FOR GATHERING FRUIT.

SPECIFICATION forming part of Letters Patent No. 624,757, dated May 9, 1899.

Application filed August 20, 1895. Renewed October 28, 1898. Serial No. 694,845. (No model.)

*To all whom it may concern:*

Be it known that I, JOHN H. CRUMB, of Osage City, in the county of Osage and State of Kansas, have invented a new and Improved Device for Gathering Fruit, of which the following is a full, clear, and exact description.

My invention relates to a device adapted to receive fruit when the same is gathered and conduct the same to the ground or to a vehicle without injury to the fruit.

The object of the invention is to save the labor of carrying heavy baskets or bags around over the fruit-tree, and thus lighten and expedite the work, as by the use of the device a person can go all over the tree and throw the fruit into the device without danger of bruising.

A further object of the invention is to provide a device for receiving gathered fruit which will be exceedingly simple, durable, and economic in its construction and which may be placed in position upon a hillside, as well as upon level ground, or mounted on the body of a wagon.

The invention consists in the novel construction and arrangement of parts, as will be hereinafter fully set forth, and pointed out in the claims.

Reference is to be had to the accompanying drawings, forming a part of this specification, in which similar characters of reference indicate corresponding parts in all the figures.

Figure 1:
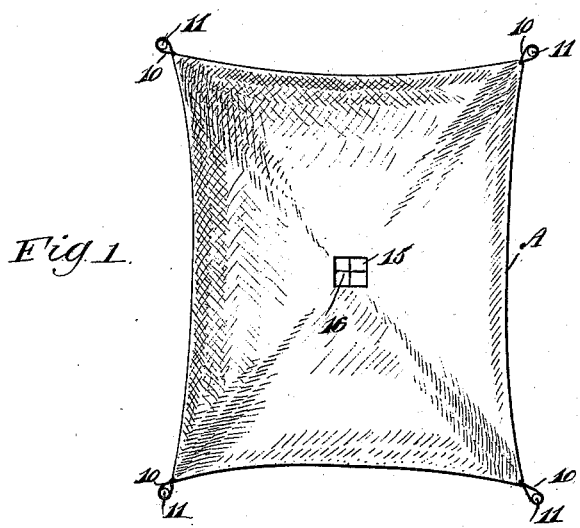
Figures 2, 3:
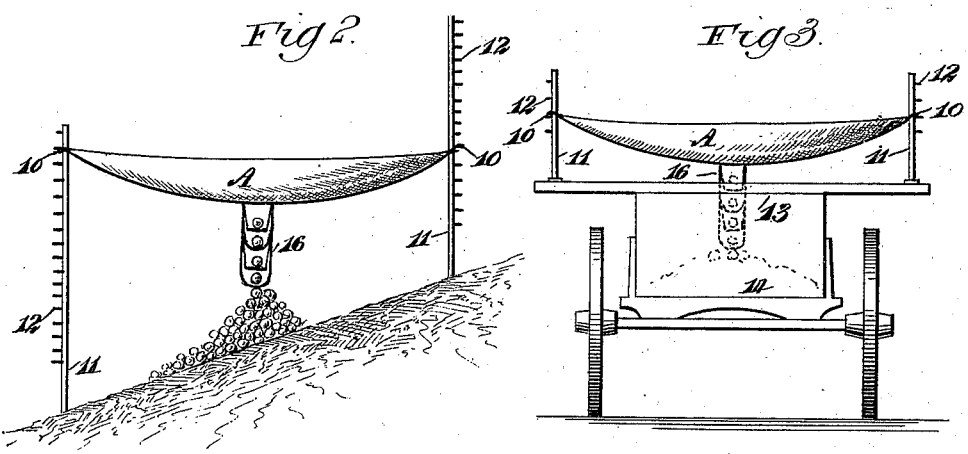

Figure 1 is a plan view of the device. Fig. 2 is a side elevation of the said device, illustrating it as placed upon a hillside and in operation. Fig. 3 is a rear elevation of a wagon having the receiving device for the fruit mounted thereon. Fig. 4 is a plan view, on an enlarged scale, of the loops below the bottom of the sheet. Fig. 5 is a side elevation, and Fig. 6 is a perspective sectional view.

In carrying out the invention a sheet A is employed, which may be of canvas or other appropriate material, and the sheet is preferably of somewhat rectangular shape, being of greater length than width, and is concaved or depressed upon its upper surface, which surface is adapted to receive the fruit thrown or deposited thereon as gathered. The said sheet is provided with a loop 10 at each of its corners, and these loops are adapted to be fitted over stakes 11, and these stakes are preferably provided with pins 12 in their outer side faces, and the loops are brought to an engagement with any of the said pins. Thus, it will be observed, when the fruit is to be gathered upon a hillside the sheet may be kept in a horizontal position by carrying the upper edges of the sheet farther down upon the upper posts than the lower edges are upon the lower posts, as illustrated in Fig. 2. These stakes may be driven into the ground, as shown in Fig. 2; but preferably they are attached to the four corners of a light frame, whereby it will be readily portable and may be easily moved from place to place, or it may be mounted upon a frame 13, supported on the bed of a wagon, as illustrated in Fig. 3. If in practice it is found desirable, these stakes or uprights may be hinged to the corners of the frame and be held upright by light braces, and thus be readily lowered to enable it to pass under the low limbs of the fruit-trees.

In the center of the sheet A an opening 15 is made of desired size, and below this opening a series of loops 16 is arranged, one below the other, and the said loops are made to cross one another at such an angle as to retard the progress of the fruit when dropping through the opening and falling to the ground, and the lowermost loop 16 is preferably made to approach the ground somewhat closely.

By the above-described construction the fruit can be cast or otherwise placed upon the sheet and will pass through the opening therein onto the first loop and from thence onto the next loop below, and so on until it reaches the ground or the receptacle. It will thus be seen that the fruit can be gathered and deposited on the ground or into a receptacle without bruising it.

Having thus described my invention, I claim as new and desire to secure by Letters Patent—

1. A device for gathering fruit, comprising a sheet of flexible material having a central opening and provided below said opening with a plurality of loops of flexible material and crossing each other, substantially as and for the purpose set forth.

2. A device for gathering fruit, comprising a sheet of flexible material having an opening therein and provided with a plurality of loops depending from the sheet below the opening thereof, the said loops being spaced apart and arranged at an angle to each other, substantially as described.

JOHN H. CRUMB.

Witnesses:
N. FRANKHOUSER,
MYRTLE H. FRANKHOUSER.